(12) United States Patent
Vazzana

(10) Patent No.: US 6,919,887 B2
(45) Date of Patent: Jul. 19, 2005

(54) NAVIGATIONAL COMPASS FOR DRAWING PROGRAMS

(75) Inventor: Gregory Vazzana, Deerfield, NH (US)

(73) Assignee: Autodesk, Inc., San Rafael, CA (US)

( * ) Notice: Subject to any disclaimer, the term of this patent is extended or adjusted under 35 U.S.C. 154(b) by 657 days.

(21) Appl. No.: 09/934,391

(22) Filed: Aug. 21, 2001

(65) Prior Publication Data

US 2003/0038797 A1 Feb. 27, 2003

(51) Int. Cl.⁷ .............................................. G06T 15/00
(52) U.S. Cl. ...................................... 345/419; 345/420
(58) Field of Search .................................. 345/419, 420

(56) References Cited

U.S. PATENT DOCUMENTS 5,734,805 A 3/1998 Isensee et al.

OTHER PUBLICATIONS

James Fuller. Using Autocad Release 10, 3d Edition. Delmar Publishers Inc., 1989, pp 8–1 through 11–6.*

* cited by examiner

Primary Examiner—Almis R. Jankus
(74) Attorney, Agent, or Firm—Gates & Cooper LLP

(57) ABSTRACT

One or more embodiments of the invention provide a visual cue for placing a first geometric entity in a three-dimensional space represented in a computer-implemented graphics program. A two-dimensional viewport of 3D space is displayed on a display device. The operator selects a first point within the two-dimensional viewport. Based on the first point, a visual cue is displayed in the two-dimensional viewport that indicates a coordinate system plane within the three-dimensional space. The coordinate system plane identifies a plane where the first geometric entity is to be placed. Using the visual cue, a second point is selected on the coordinate system plane in the two-dimensional viewport. Thereafter, the first geometric entity is placed on the coordinate system plane based on the second point.

33 Claims, 7 Drawing Sheets

NAVIGATIONAL COMPASS FOR DRAWING PROGRAMS

BACKGROUND OF THE INVENTION

1. Field of the Invention

The present invention relates generally to drawing programs, and in particular, to a method, apparatus, and article of manufacture for navigating in space within a drawing program.

2. Description of the Related Art

Computer-implemented graphics systems have been widely used by designers, illustrators, drafters, and engineers for a number of years. Most such graphics systems use a two-dimensional (2D) graphical user interface (GUI) to display graphical images, such as 2D or three-dimensional (3D) models, schematic diagrams, photorealistic images, etc. When a 3D space is displayed in a 2D GUI, the operator is responsible for perceiving the third dimension, and may be aided by perspective views, rendering, shadows or other visual cues provided by the graphics systems. However, such visual cues are limited and may not assist the user as desired.

The graphical images being displayed in graphics systems may comprise one or more geometric entities such as pipes, plumbing, electrical wiring, columns, chairs, tables, signs, etc. in the three-dimensional space. When placing such a geometric entity, the prior art fails to provide visual feedback as to where the geometric entity lies in three-dimensional space. This may be particularly problematic when placing or linking together multiple geometric entities in three dimensional space since the operator cannot clearly identify the three-dimensional plane(s) where the geometric entity is being placed. For example, when placing ducting for an HVAC (heating ventilation air conditioning) system, the operator may desire to place the ducting on multiple different planes in order to provide proper ventilation around existing structures (e.g., walls, beams, studs, etc.). Without visual feedback, it is very difficult, if not impossible, to identify and select the directions and planes where the ducting is being placed.

Consequently, there is a need in the art for improved techniques for providing visual clues to assist in the placement of geometric entities in 3D space in graphics systems.

SUMMARY OF THE INVENTION

One or more embodiments of the invention provide a method, apparatus, and article of manufacture for placing a geometric entity in a three-dimensional space represented in a computer-implemented graphics program. A visual cue assists the user in placing the geometric entity. The visual cue identifies the plane within three-dimensional space that the geometric entity is being placed within. The visual cue may identify different planes by altering its shape/appearance to provide an appearance of being parallel or lying on a particular plane.

Additional features on the visual cue may provide for tick marks that allow the operator to predefine increments/angles around the visual cue for further visual assistance. Further, predefined increments/angles may be used to snap the geometric entity to a particular position. Another feature of the invention provides for displaying a temporary representation of the geometric entity when it is being placed so that the user can visualize the geometric entity when determining the appropriate placement location.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a visual cue that assists an operator in placing a geometric entity in 3D space. With the visual cue, operators ate able to see where the next point of the geometric entity will lie in relation to the current geometry displayed. In addition, the visual cue may provide "snapping" to user specified angles or snapping based on an incremental value (e.g., if 90 degrees is the increment, then the visual cue will cause the user to snap to 0, 20, 180, or 270).

Hardware Environment

Figure 1:
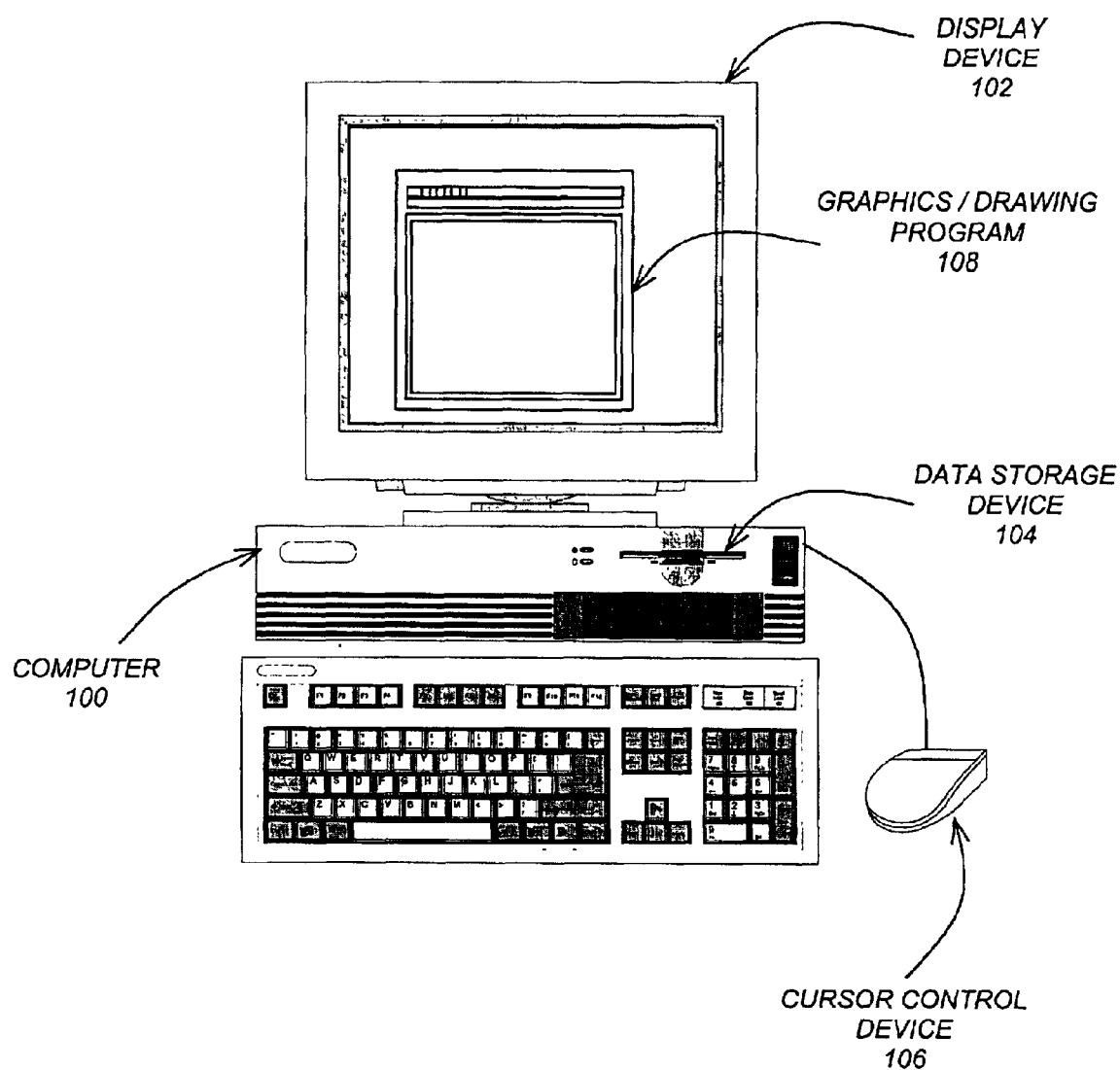
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
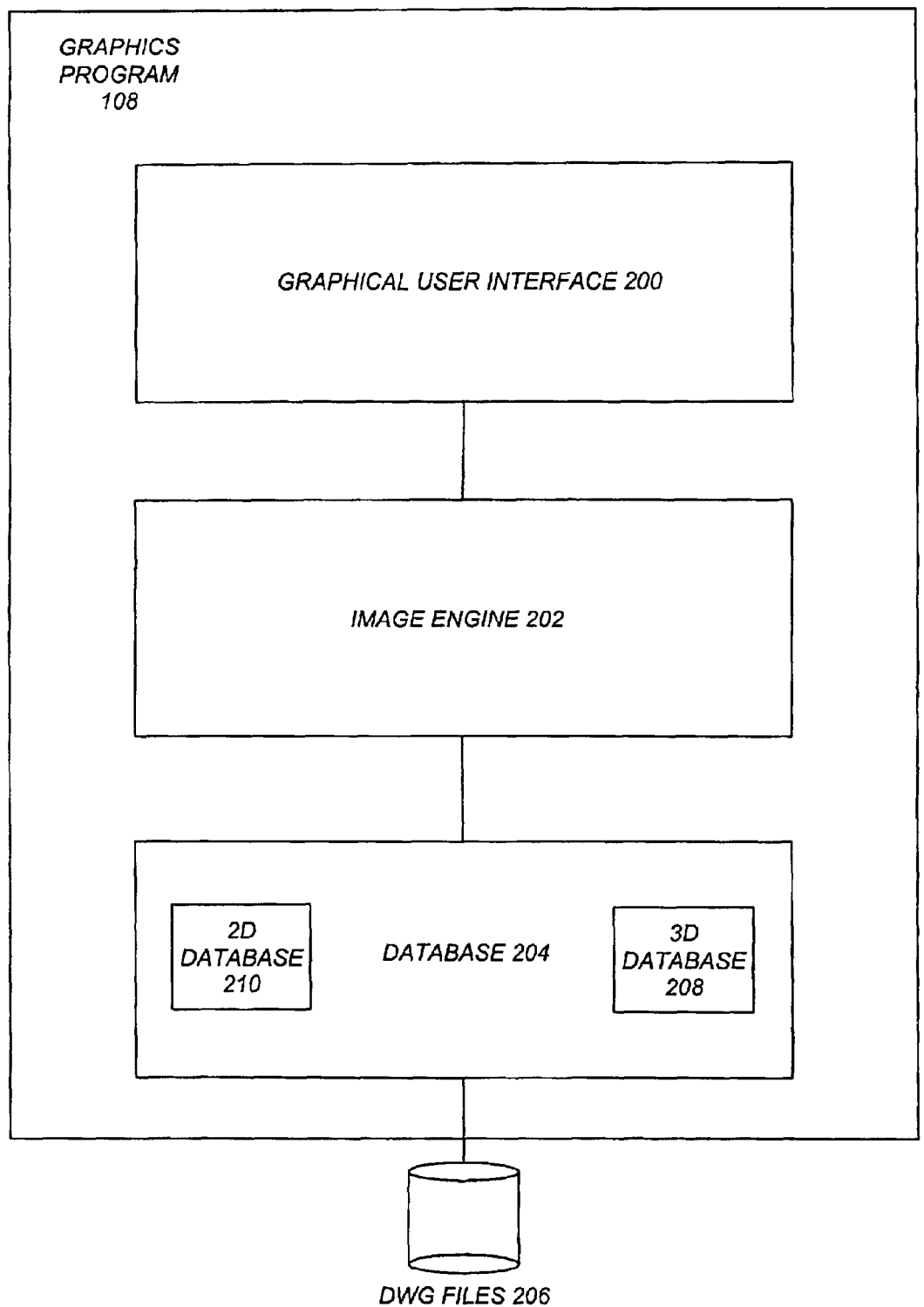
FIG. 2 is a block diagram that illustrates the components of a graphics program in accordance with one or more embodiments of the invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 102 for display. In one or more embodiments, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Software Embodiments

In one or more embodiments of the invention, graphical user interface 200 presents a visual cue on display device 102 that assists an operator in placing a geometric entity in 3D space in the 2D viewport. With the visual cue, operators are able to see where the next point of the geometric entity will lie in relation to the current geometry on the display device 102. The visual cue may consist of a variety of geometric entities/shapes. For example, the visual cue may comprise an ellipse/circle, an arrow, a triangle, etc. Embodiments of the invention are intended to include any shape or geometric entity as the visual cue. However, throughout the description herein, an ellipse/circle, referred to as a compass, is used as the visual cue.

Various coordinate spaces/systems may be defined by an operator and used by graphics program 108. For example, some drawing programs 108 may provide both a fixed coordinate system called the world coordinate system (WCS) and a moveable coordinate system called the user coordinate system (UCS). The UCS is useful for entering coordinates, defining drawing planes, and setting views. Changing the UCS does not change the operator's viewpoint but merely changes the orientation and tilt of the coordinate system. When creating 3D objects, the UCS may be relocated to simplify the creation process. For example, if the operator has created a 3D box, each of the six sides of the box may be easily edited by aligning the UCS with each side as it is being edited.

A UCS may be relocated anywhere in 3D space by choosing the location of the origin point and the orientation of the XY plane and the Z-axis. Only one UCS may be current at any given time, and all coordinate input and display is relative to the UCS. If multiple 2D viewports are displayed, they share the current UCS. Further, the WCS and UCS are often coincident with their axes and origin points overlapping exactly. Accordingly, the UCS often defines the current plane of a viewport and may be the same as the WCS.

Once a coordinate system (i.e., WCS or a UCS) is chosen in graphics program 108, a view/viewing angle of that coordinate system may be selected. A viewing angle is the direction of the view relative to the coordinate system being used. Different 3D viewing angles may be predefined and accessed using a name or description. Such names may use commonly used options such as top, bottom, front, left, right, and back. In addition, predefined views may provide for isometric options such as SW. (southwest) isometric, SE. (southeast) isometric, NE. (northeast) isometric, and NW. (northwest) isometric.

Each of the above predefined names may be better understood by referencing a box/cube. When viewing the box from the top, bottom, front, left, right, and back, the view is referred to as a plan view. If the lower-left corner of the (top of the box) is the center viewpoint, the box is viewed from the SW isometric view. If the upper-right corner of the box is the center viewpoint, the box is being viewed from a NE isometric view.

Thus, a plan view is a view aimed toward the origin (0,0,0) from a point on the positive Z-axis. Accordingly, a plan view results in a view of an XY plane (or more of a 2D display). Similarly, to view a drawing in a coordinate system on a plane other than an XY plane (i.e., in a 3D view to provide an easier view of the 3D space), one of the isometric views may be selected.

Figure 3A:
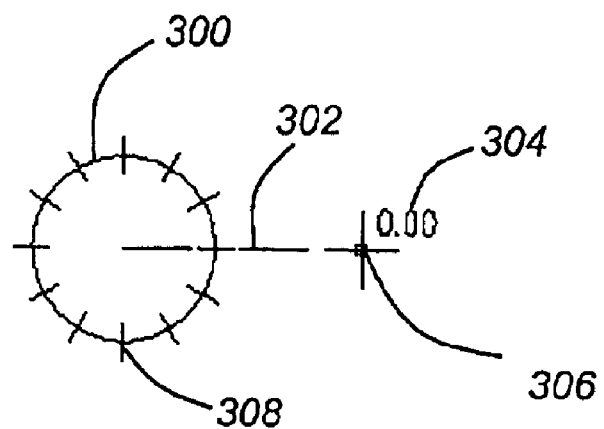
FIGS. 3A and 3B illustrate a plan view and 3D view respectively of a compass in accordance with one or more embodiments of the invention.
Figure 3B:
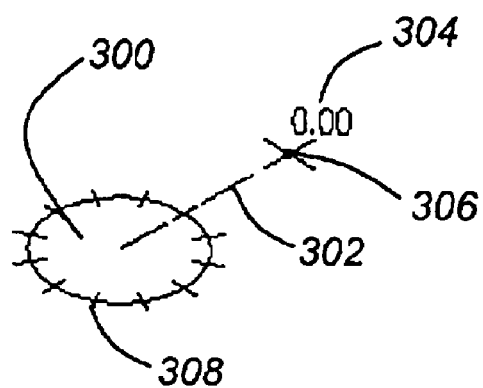

FIGS. 3A and 3B illustrate a plan view and 3D view respectively of a compass in accordance with one or more embodiments of the invention. Compass 300 provides a visual cue of the plane (where the geometric entity is to be drawn) by the shape of the compass 300. As illustrated in FIG. 3A, in a plan view the compass 300 appears flat and in a circular shape since the view is on an XY plane (that appears two-dimensional). However, as illustrated in FIG. 3B, the compass 300 is an ellipse and appears to be at an angle. Accordingly, the compass 300 of FIG. 3B indicates a plane other than an XY plane.

To display compass 300, the operator selects a first/starting point in the two-dimensional viewport on the display device 102 using a cursor control device 106 (or other input mechanism). The first point then becomes the center of compass 300.

Additionally, once the first point is selected, a temporary representation 302 of the geometric entity (to be placed) is displayed originating from the first point. The temporary representation 302 may take many forms such as a skeleton or dimmed version of the geometric entity, a line, a cylinder, etc. The shape and angle/orientation at which the temporary representation 302 is displayed is based on the location of the cursor. Accordingly, as the cursor is moved around, the angle and direction of the temporary representation 302 may change. The angle of the temporary representation 302 from a point of origin on the compass may also be displayed numerically 304. Further, the temporary representation 302 may stretch to the cursor location. For example, the size of a pipe being laid may stretch or compress based on the distance between the first point and the cursor location.

Once the appropriate angle/orientation has been reached, a second point 306 (identified by the cursor location) is selected. The second point 306 is used to identify the ending point of the geometric entity being placed. Thus, if ducting is being laid, the ducting would run from the first point in the center of the compass 300 to the ending point 306. In another embodiment, once the first point is selected, the compass 300 is displayed merely to aid in selecting an angle and plane. Thereafter, when the second point 306 is selected, the geometric entity is placed based on the second point. For example, a chair may be placed with the center of the chair seat on the second point 306.

Figure 4A:
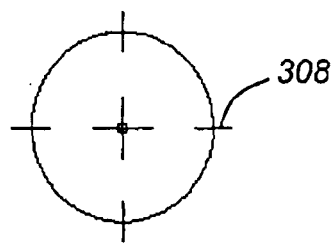
FIGS. 4A, 4B, and 4C illustrate the use of tick marks at varying intervals/increments in accordance with one or more embodiments of the invention.
Figure 4B:
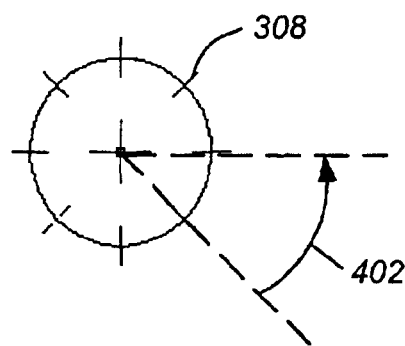
Figure 4C:
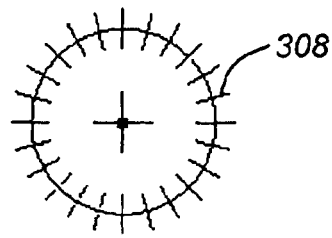

To provide further clarification during the placement of a geometric entity, the compass may be displayed with various tick marks 308. FIGS. 4A, 4B, and 4C illustrate the use of tick marks 308 at varying internals/increments. The tick marks 308 allow the operator to easily identify specific angles 402 from the starting point for the placement of a geometric entity. FIG. 4A illustrates tick marks 308 with 90 degree increments. Similarly, FIG. 4B illustrates tick marks 308 in 45 degree increments and FIG. 4C illustrates tick marks 308 in 15 degree increments.

In addition, the compass may provide "snapping" to user specified angles or snapping based on an incremental value (e.g., if 90 degrees is the increment, then the compass will cause the user to snap to 0, 20, 180, or 270). Such snapping may coincide with the tick mark 308 increments. However, snapping may also occur at a different increment from that of the tick mark 308 increments. Accordingly, as the operator moves the cursor around, the temporary representation 302 may snap to a line corresponding to the snap angle closest to the cursor location. Alternatively, the numeric degree 304 may indicate the angle that the geometric entity will snap to while the temporary representation 302 remains displayed between the first point and cursor location. Thus, as the cursor is moved around the compass 300 the temporary representation 302 snaps in predefined increments. Such a snapping capability may be enabled or disabled by the operator.

Depending on the viewing capabilities (e.g., size) of the display device 102, an operator may desire to vary the size of the displayed visual cue. For example, if the visual cue is a compass 300, the operator may be permitted to adjust the diameter of the compass.

Figure 5:
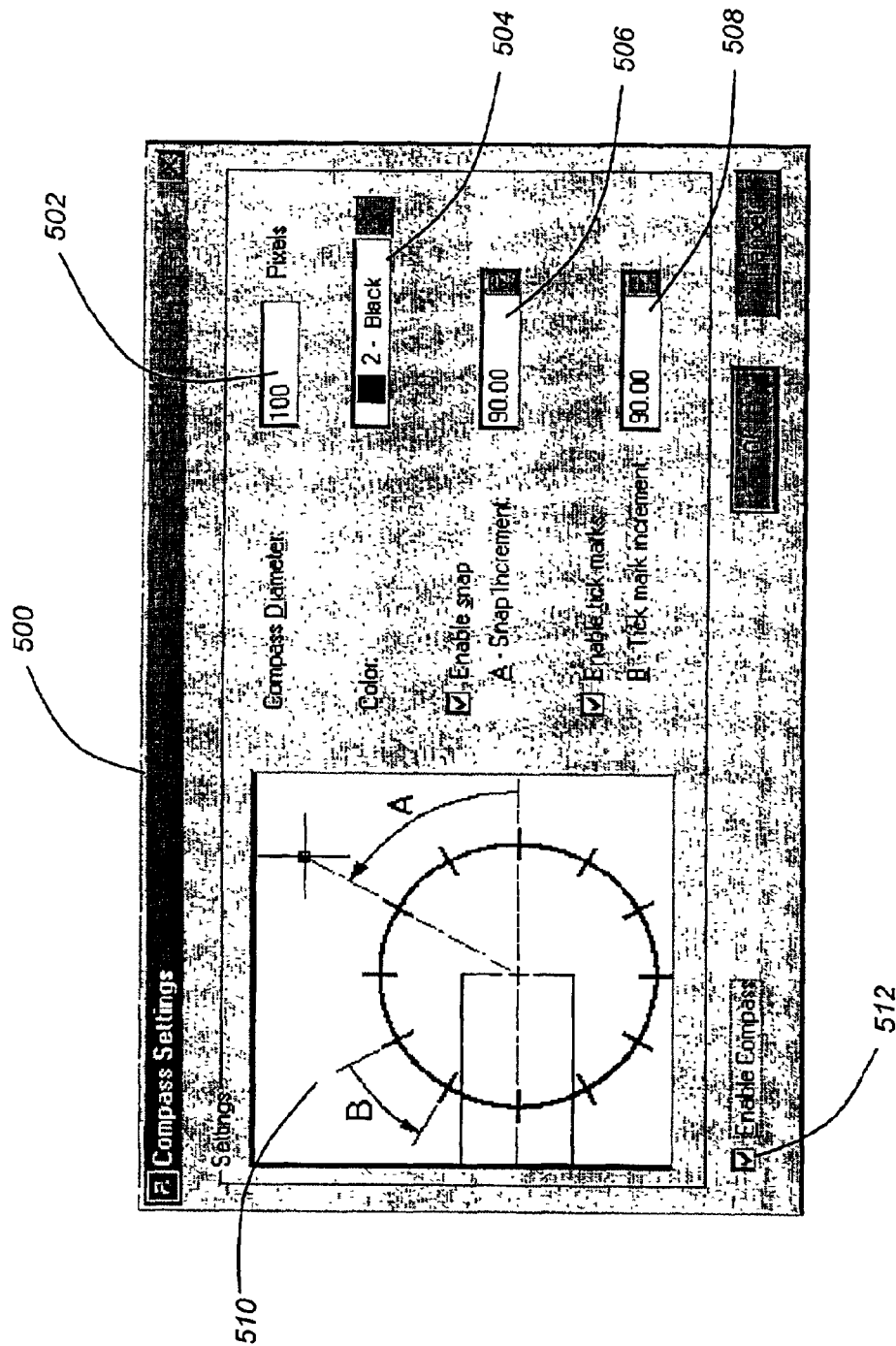
FIG. 5 illustrates a compass settings dialog for setting various parameters for a compass visual cue in accordance with one or mote embodiments of the invention.

FIG. 5 illustrates a compass 300 settings dialog for setting various parameters for a compass 300 visual cue in accordance with one or more embodiments of the invention. Dialog 500 can be displayed on display device 102 to allow a user/operator to adjust settings for the compass 300. As illustrated, the compass 300 diameter (e.g., number of pixels) can be adjusted in text box 502 and the color of the compass 300 can be adjusted in list box area 504. The snapping increment/angle (i.e., "A" in FIG. 5) may be set in list box area 506 and enabled using a checkbox. Similarly, the tick mark 308 (i.e., "B" in FIG. 5) increment/angle 402 may be set in list box area 508 and enabled using a check box. As the various compass 300 settings 502–508 are modified, the changes may be reflected in display area 510. Further, the operator has the option of enabling the program 108 to display the compass 300 using checkbox 512.

Figure 6A:
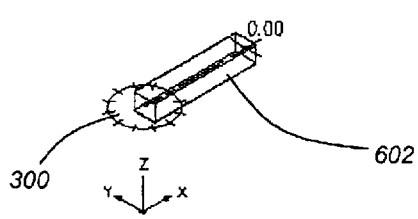
FIGS. 6A–6F illustrate the use of a compass visual cue to aid in the placement of ducts in accordance with one or more embodiments of the invention.
Figure 6B:
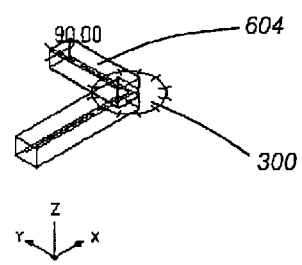

FIGS. 6A–6F illustrate the use of the compass 300 to aid in the placement of ducts in accordance with one or more embodiments of the invention. FIG. 6A shows the placement of a first duct 602 on a first plane as indicated by the shape of the compass 300. Once the ending point for the duct 602 is selected, the compass 300 moves locations to the selected point while the location of the second duct 604 is determined as indicated in FIG. 6B.

Figure 6C:
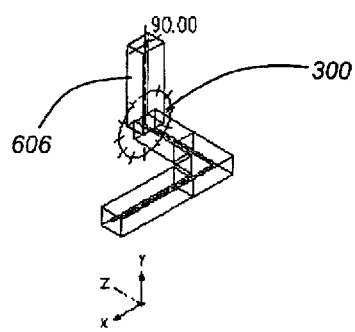
Figure 6D:
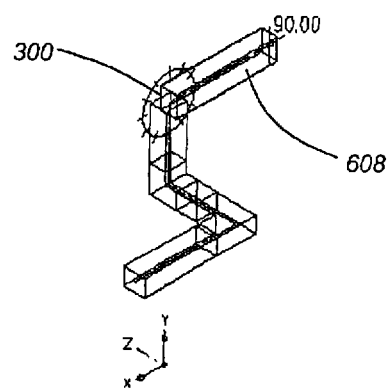
Figure 6E:
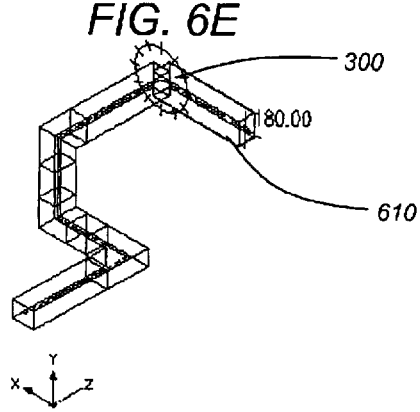
Figure 6F:
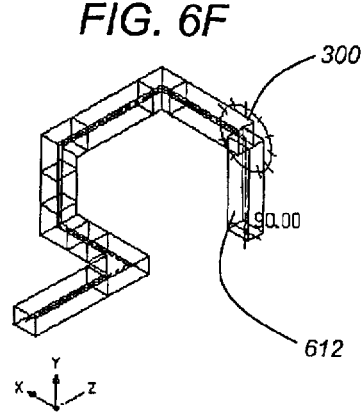

Once the endpoint for duct 604 is selected, the compass moves again to the selected point as indicated in FIG. 6C. However, as illustrated in FIG. 6C, the operator has elected to switch the plane for placing duct 606. For example, the operator may type a keyboard command such as "P" to switch the plane for the duct placement. As illustrated in FIG. 6C, the shape of the compass 300 is modified to indicate the newly selected plane. The plane remains the same for the placement of duct 608 in FIG. 6D. However, the user elects to switch the plane once again in FIG. 6E for the placement of duct 610. Thereafter, the plane remains the same for the placement of duct 612 in FIG. 6F.

As illustrated in FIGS. 6A–6F, the compass provides a visual cue to assist the operator in placing ducts 602–612.

Further, as illustrated, the angles for the placement of the ducts 602–612 may be indicated numerically during the placement process.

Figure 7:
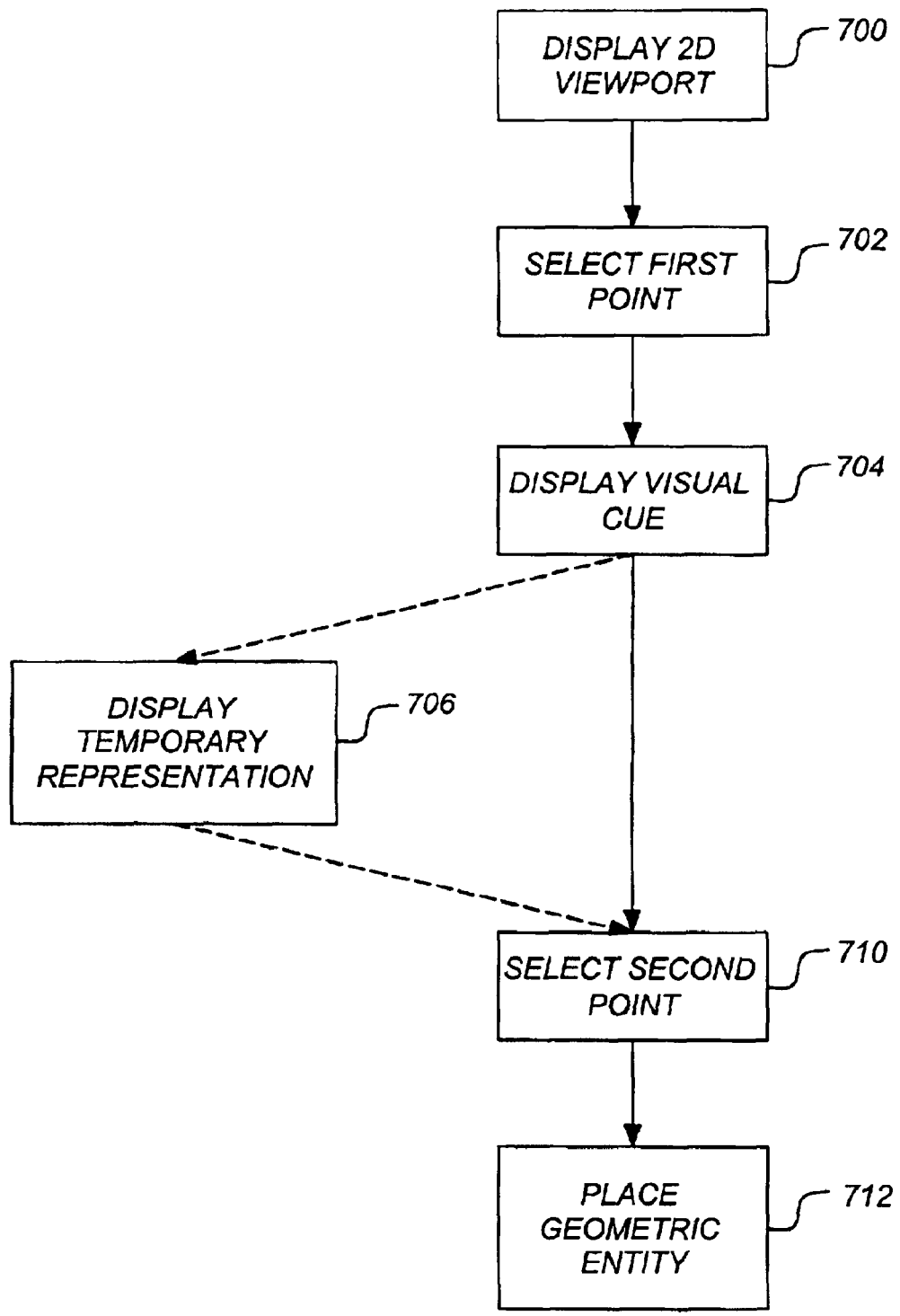
FIG. 7 is a flow chart illustrating the placement of a geometric entity in accordance with one or mote embodiments of the invention.

FIG. 7 is a flow chart illustrating the placement of a geometric entity in accordance with one or more embodiments of the invention. At step 700, a two-dimensional viewport of the three-dimensional space is displayed on a display device 102 attached to a computer 100. At step 702, a first point is selected in the 2D viewport.

At step 704, a visual cue, based on the first point (e.g., by centering the visual cue on the first point), is displayed in the 2D viewport. As described above, the visual cue may comprise a variety of shapes or geometric entities such as a circle or ellipse (e.g., the compass 300) and indicates/identifies a coordinate system (e.g., UCS or WCS) plane within the 3D space. Further, the identified coordinate system plane corresponds to a plane where the geometric entity is being placed. For example, a compass 300 visual cue may be displayed in a plan view or at a slight angle to indicate a coordinate system plane as illustrated in FIGS. 3A and 3B and FIGS. 6A–6F. Additionally, step 704 may also include changing the coordinate system plane that the geometric entity will be placed on.

After displaying the visual cue at step 704, graphics program 108 may optionally display a temporary representation of the geometric entity to be placed at step 706. Such a temporary representation may originate at the first point and end at the location of the cursor.

At step 710, a second point is selected on the indicated coordinate system plane using the visual cue. For example, compass 300 may display the temporary representation 302, tick marks 308, and utilize snap angles that assist the operator in determining where the geometric entity will be placed and thereby assisting in the selection of a second point. Once the second point is selected, the geometric entity is placed on the coordinate system plane based on the second point at step 712. For example, the geometric entity may be placed between the first point and second point. Such a process may continue thereafter to allow multiple geometric entities (e.g., piping or ducting) to be chained/connected together on one or more planes.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method for placing a geometric entity in a 3D space using a visual cue to assist in such placement.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for providing a visual cue for placing a first geometric entity in a three-dimensional space represented in a computer-implemented graphics program, comprising:
   (a) displaying a two-dimensional viewport of the three-dimensional space on a display device attached to a computer;

(b) selecting a first point in the two-dimensional viewport;

(c) based on the first point, displaying a visual cue comprising a second geometric entity placed in the two-dimensional viewport, wherein the visual cue indicates a coordinate system plane within the three-dimensional space, and the coordinate system plane identifies a plane where the first geometric entity is to be placed;

(d) using the visual cue, selecting a second point on the coordinate system plane in the two-dimensional viewport; and (e) placing the first geometric entity on the coordinate system plane based on the second point.

2. The method of claim 1 wherein the second geometric entity comprises a circle in the three-dimensional space oriented on the coordinate system plane displayed in the two-dimensional viewport.

3. The method of claim 1 wherein:

the second geometric entity comprises an ellipse displayed in the two-dimensional viewport; and a center of the ellipse is displayed on the first point.

4. The method of claim 1 wherein tick marks are displayed on the second geometric entity.

5. The method of claim 4 wherein a distance between two tick marks may be specified.

6. The method of claim 1 further comprising displaying a temporary representation of the first geometric entity originating at the first point and ending at a cursor location, wherein:

the temporary version represents where the first geometric entity is to be placed;

the second point is selected at the cursor location.

7. The method of claim 1 wherein the orientation of the first geometric entity snaps to a particular angle from the first point.

8. The method of claim 7 wherein the visual cue displays the numeric degree of the particular angle.

9. The method of claim 7 wherein the visual cue indicates available angles for the orientation of the first geometric entity.

10. The method of claim 1 wherein an increment value for snap angles may be specified.

11. The method of claim 1 wherein the particular angle may be specified by a user.

12. An computer-implemented graphics system for providing a visual cue for placing a first geometric entity in a three-dimensional space, comprising:

(a) a computer having a display device attached thereto;

(b) means, performed by the computer, for displaying a two-dimensional viewport of the three-dimensional space on the display device;

(c) means, performed by the computer, for selecting a first point in the two-dimensional viewport;

(d) means, performed by the computer, for displaying, based on the first point, a visual cue comprising a second geometric entity placed in the two-dimensional viewport, wherein the visual cue indicates a coordinate system plane within the three-dimensional space, and the coordinate system plane identifies a plane where the first geometric entity is to be placed;

(e) means, performed by the computer, for selecting, using the visual cue, a second point on the coordinate system plane in the two-dimensional viewport; and (f) means, performed by the computer, for placing the first geometric entity on the coordinate system plane based on the second point.

13. The system of claim 12 wherein the second geometric entity comprises a circle in the three-dimensional space oriented on the coordinate system plane displayed in the two-dimensional viewport.

14. The system of claim 12 wherein:

the second geometric entity comprises an ellipse displayed in the two-dimensional viewport; and a center of the ellipse is displayed on the first point.

15. The system of claim 12 wherein tick marks are displayed on the second geometric entity.

16. The system of claim 15 wherein a distance between two tick marks may be specified.

17. The system of claim 12 further comprising means, performed by the computer, for displaying a temporary representation of the first geometric entity originating at the first point and ending at a cursor location, wherein:

the temporary version represents where the first geometric entity is to be placed;

the second point is selected at the cursor location.

18. The system of claim 12 wherein the orientation of the first geometric entity snaps to a particular angle from the first point.

19. The system of claim 18 wherein the visual cue displays the numeric degree of the particular angle.

20. The system of claim 18 wherein the visual cue indicates available angles for the orientation of the first geometric entity.

21. The system of claim 12 wherein an increment value for snap angles may be specified.

22. The system of claim 12 wherein the particular angle may be specified by a user.

23. An article of manufacture embodying logic for performing a method for providing a visual cue for placing a first geometric entity in a three-dimensional space represented in a computer-implemented graphics system, the method comprising:

(a) displaying a two-dimensional viewport of the three-dimensional space on a display device attached to a computer;

(b) selecting a first point in the two-dimensional viewport;

(c) based on the first point, displaying a visual cue comprising a second geometric entity placed in the two-dimensional viewport, wherein the visual cue indicates a coordinate system plane within the three-dimensional space, and the coordinate system plane identifies a plane where the first geometric entity is to be placed;

(d) using the visual cue, selecting a second point on the coordinate system plane in the two-dimensional viewport; and (e) placing the first geometric entity on the coordinate system plane based on the second point.

24. The article of manufacture of claim 23 wherein the second geometric entity comprises a circle in the three-dimensional space oriented on the coordinate system plane displayed in the two-dimensional viewport.

25. The article of manufacture of claim 23 wherein:

the second geometric entity comprises an ellipse displayed in the two-dimensional viewport; and a center of the ellipse is displayed on the first point.

26. The article of manufacture of claim 23 wherein tick marks are displayed on the second geometric entity.

27. The article of manufacture of claim 26 wherein a distance between two tick marks may be specified.

28. The article of manufacture of claim 23, the method further comprising displaying a temporary representation of the first geometric entity originating at the first point and ending at a cursor location, wherein:

the temporary version represents where the first geometric entity is to be placed;

the second point is selected at the cursor location.

29. The article of manufacture of claim 23 wherein the orientation of the first geometric entity snaps to a particular angle from the first point.

30. The article of manufacture of claim 29 wherein the visual cue displays the numeric degree of the particular angle.

31. The article of manufacture of claim 29 wherein the visual cue indicates available angles for the orientation of the first geometric entity.

32. The article of manufacture of claim 23 wherein an increment value for snap angles may be specified.

33. The article of manufacture of claim 23 wherein the particular angle may be specified by a user.

* * * * *